US 7,934,689 B2

(12) United States Patent
Chiu et al.

(10) Patent No.: US 7,934,689 B2
(45) Date of Patent: May 3, 2011

(54) DISPLAY WITH AUTOMATIC LOCKING DEVICE

(75) Inventors: Chun-Chao Chiu, Taipei (TW); Wei-Shin Shiu, Taipei County (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 11/504,963

(22) Filed: Aug. 15, 2006

(65) Prior Publication Data
US 2007/0034759 A1    Feb. 15, 2007

(30) Foreign Application Priority Data

Aug. 15, 2005    (TW) ................. 94127734 A

(51) Int. Cl.
| A47K 1/00 | (2006.01) |
| A47K 5/00 | (2006.01) |
| E04G 5/06 | (2006.01) |
| A47B 96/00 | (2006.01) |
| F16L 3/08 | (2006.01) |
| F21V 21/00 | (2006.01) |
| F21V 35/00 | (2006.01) |

(52) U.S. Cl. ............. 248/222.11; 248/176.3; 248/122.1; 248/922; 248/923; 248/917; 248/919; 248/921; 361/679.01; 361/679.02; 361/679.06; 361/679.09; 361/679.12; 361/679.21; 361/679.22; 70/58; 292/137; 292/145; 292/146; 292/302; 292/163; 292/175

(58) Field of Classification Search .................. 248/917, 248/919, 921, 922, 923, 176.3, 122.1, 222.11, 248/221.11; 361/681, 679.01, 679.02, 679.12, 361/379.09, 679.06, 679.21, 679.22; 70/58; 292/137, 145, 146, 302, 163, 175, DIG. 11
See application file for complete search history.

(56) References Cited

U.S. PATENT DOCUMENTS

| 5,465,191 | A | * | 11/1995 | Nomura et al. ............... 361/681 |
| 6,094,341 | A | * | 7/2000 | Lin ................. 361/681 |
| 6,125,040 | A | * | 9/2000 | Nobuchi et al. ............... 361/726 |
| 6,344,825 | B1 | * | 2/2002 | Wong ............. 343/702 |
| 6,353,529 | B1 | | 3/2002 | Cies |
| 6,430,038 | B1 | * | 8/2002 | Helot et al. ................... 361/681 |
| 6,464,195 | B1 | * | 10/2002 | Hildebrandt ................. 248/460 |
| 6,504,707 | B2 | * | 1/2003 | Agata et al. .................. 361/681 |
| 6,532,147 | B1 | * | 3/2003 | Christ, Jr. ...................... 361/683 |
| 6,704,194 | B2 | * | 3/2004 | Koo ............................. 361/683 |
| 6,707,665 | B2 | * | 3/2004 | Hsu et al. ...................... 361/681 |
| 7,035,090 | B2 | * | 4/2006 | Tanaka et al. ................. 361/681 |
| 7,042,711 | B2 | * | 5/2006 | Tanaka et al. ................. 361/679 |
| 7,079,384 | B2 | * | 7/2006 | Wang et al. ................... 361/686 |
| 7,203,058 | B2 | * | 4/2007 | Hong ............................ 361/681 |
| 7,206,196 | B2 | * | 4/2007 | Ghosh et al. .................. 361/683 |
| 7,215,546 | B2 | * | 5/2007 | Hata et al. ..................... 361/699 |
| 7,274,555 | B2 | | 9/2007 | Kim et al. |
| 2002/0044411 | A1 | | 4/2002 | Iredale |
| 2003/0223190 | A1 | * | 12/2003 | Hashimoto ................... 361/683 |
| 2005/0036284 | A1 | * | 2/2005 | Kang ............................ 361/683 |
| 2005/0052833 | A1 | * | 3/2005 | Tanaka et al. ................. 361/681 |
| 2005/0105263 | A1 | * | 5/2005 | Tanaka et al. ................. 361/683 |
| 2007/0058331 | A1 | * | 3/2007 | Schwager et al. ............. 361/683 |

* cited by examiner

*Primary Examiner* — Terrell Mckinnon
*Assistant Examiner* — Nkeisha J Smith

(57) ABSTRACT

A display with an automatic locking device. The display includes a body, a support, and a sliding assembly. The support is connected to the body. The base connects with the support in a rotatable manner. The sliding assembly is movably disposed on the base in a manner such that the sliding assembly can move between a first position and a second position. When the sliding assembly is in the first position, the support is separated from the sliding assembly. When the sliding assembly is in second position, the support is engaged with the sliding assembly.

16 Claims, 5 Drawing Sheets

US 7,934,689 B2

DISPLAY WITH AUTOMATIC LOCKING DEVICE

BACKGROUND

The invention relates to a display, and in particular, to a display with an automatic locking device.

FIG. 1 depicts a conventional display 1 with a double swivel device, comprising a body 2, a support 3, and a base 4. The body 2 comprises a first hinge 21, a fixed board 22, and a screen 23. The first hinge 21 of the body 2 is connected to the support 3. The screen 23 is connected to the fixed board 22. The support 3 is connected to the base 4 by a second hinge 31. The support 3 and the base 4 are utilized to support the screen 23.

When the display 1 is packed in a box for shipping, the body 2, the support 3, and the base 4 are folded together firstly. Next, the body 2, the support 3, and the base 4 are tied together with a Mylar sheet and finally put the display into the box. The elements of the display cannot tightly abut each other even using a Mylar sheet when the display 1 is on a production line. Thus, it is difficult to place the display 1 into a buffer of the box, wasting assembly time and increasing production costs.

SUMMARY

The invention provides a display with a locking device, which can utilize particular elements to tightly engage the base and the support, thus assembly is simplified.

Accordingly, a display with an automatic locking device is provided. The display comprises a body, a support, a base, and a sliding assembly. The support is connected to the body. The base connects with the support in a rotatable manner. The sliding assembly is movably disposed on the base in a manner such that it can selectively move between a first position and a second position. When the sliding assembly is in the first position, the support is separated from the sliding assembly. When the sliding assembly is in the second position, the support is engaged with the sliding assembly.

Furthermore, the support comprises an opening and an engaging element. When the sliding element is in the second position, the sliding element is received in the opening and engaged with the engaging element. The base comprises a cap covering the sliding assembly.

The sliding assembly comprises a sliding element and an elastic element. The sliding element comprises a notch. The elastic element connects with the sliding element. When the sliding assembly is in the first position, the engaging element separates from the notch and the cap separates from the support. When the sliding assembly is in the second position, the opening of the support is engaged in the cap and the engaging element is engaged in the notch. The elastic element maintains the sliding assembly in the second position.

The display further comprises a first hinge and a second hinge. The body rotates with respect to the support. The body further comprises a fixed board and a screen. The fixed board is connected with the support through the first hinge, and rotates with respect to the support. The screen is fixed to one surface of the fixed board. The support further comprises two support arms, and the fixed board is received between two support arms. The support is connected with the base through the second hinge.

DESCRIPTION OF THE DRAWINGS

The invention can be more fully understood by reading the subsequent detailed description and examples with references made to the accompanying drawings, wherein.

DETAILED DESCRIPTION

Figure 1:
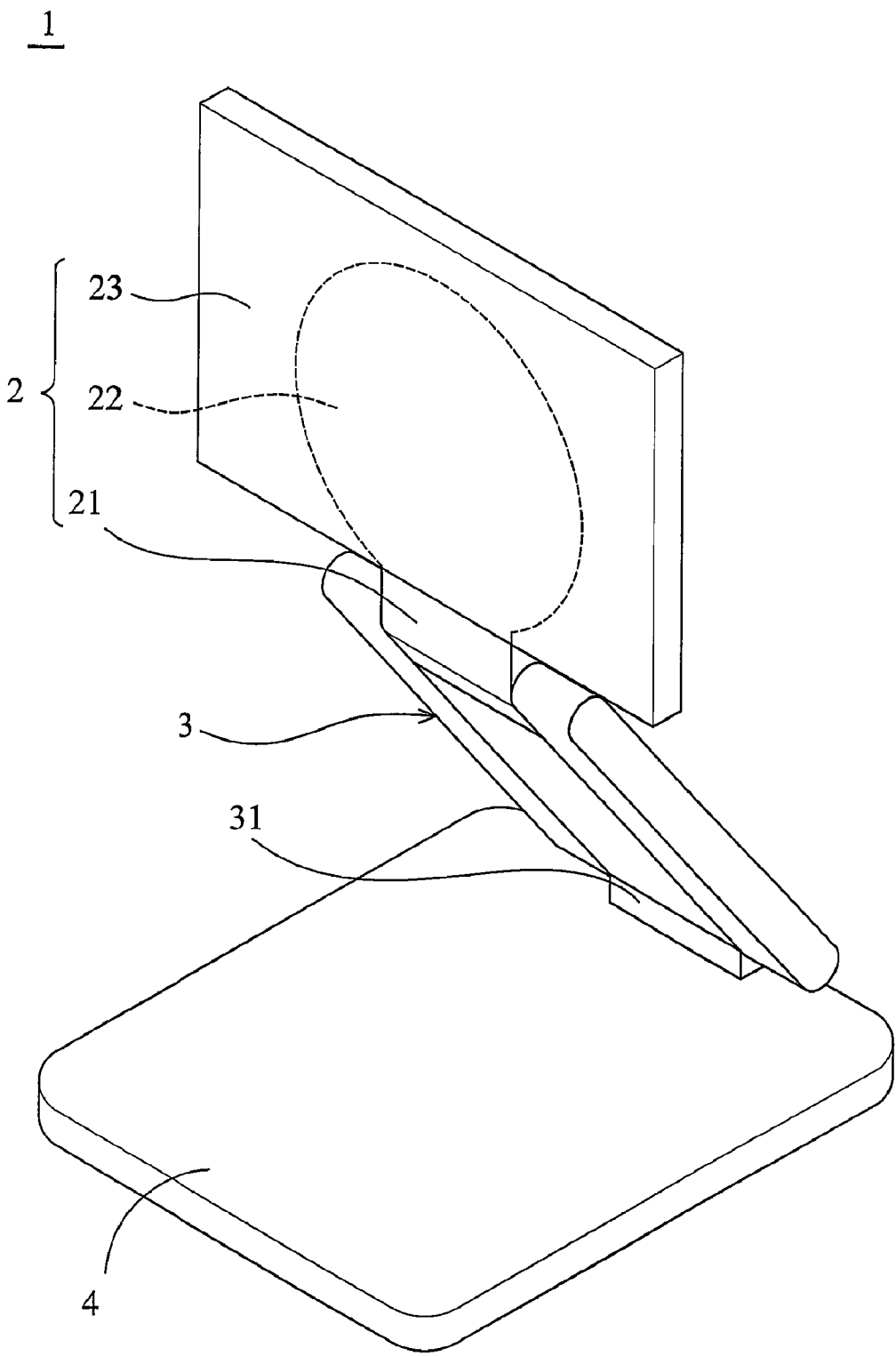
FIG. 1 is a schematic view of a base of a conventional display.
Figure 2:
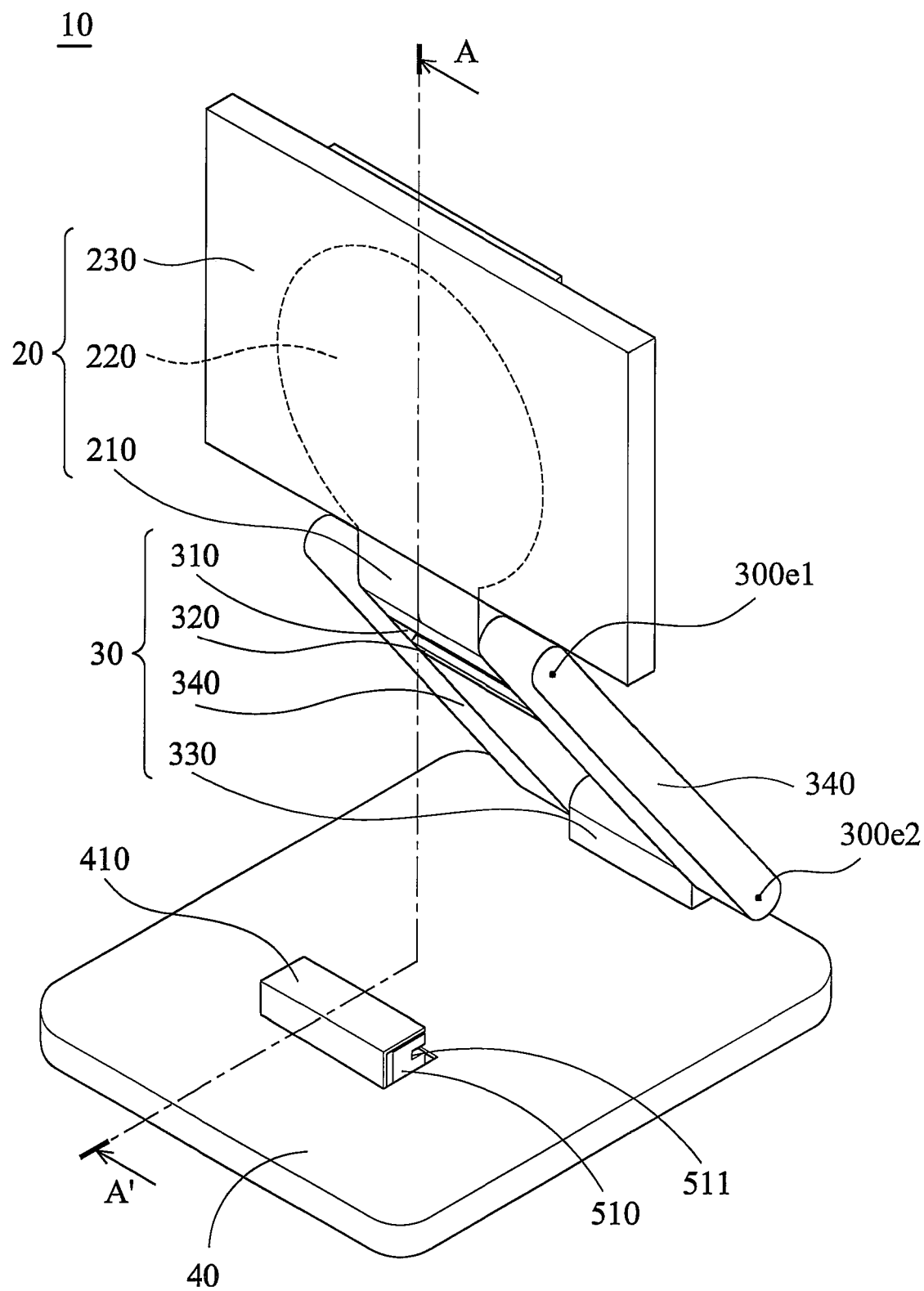
FIG. 2 is a 3-D schematic view of an embodiment of a display, wherein the display is unfolded.
Figure 3:
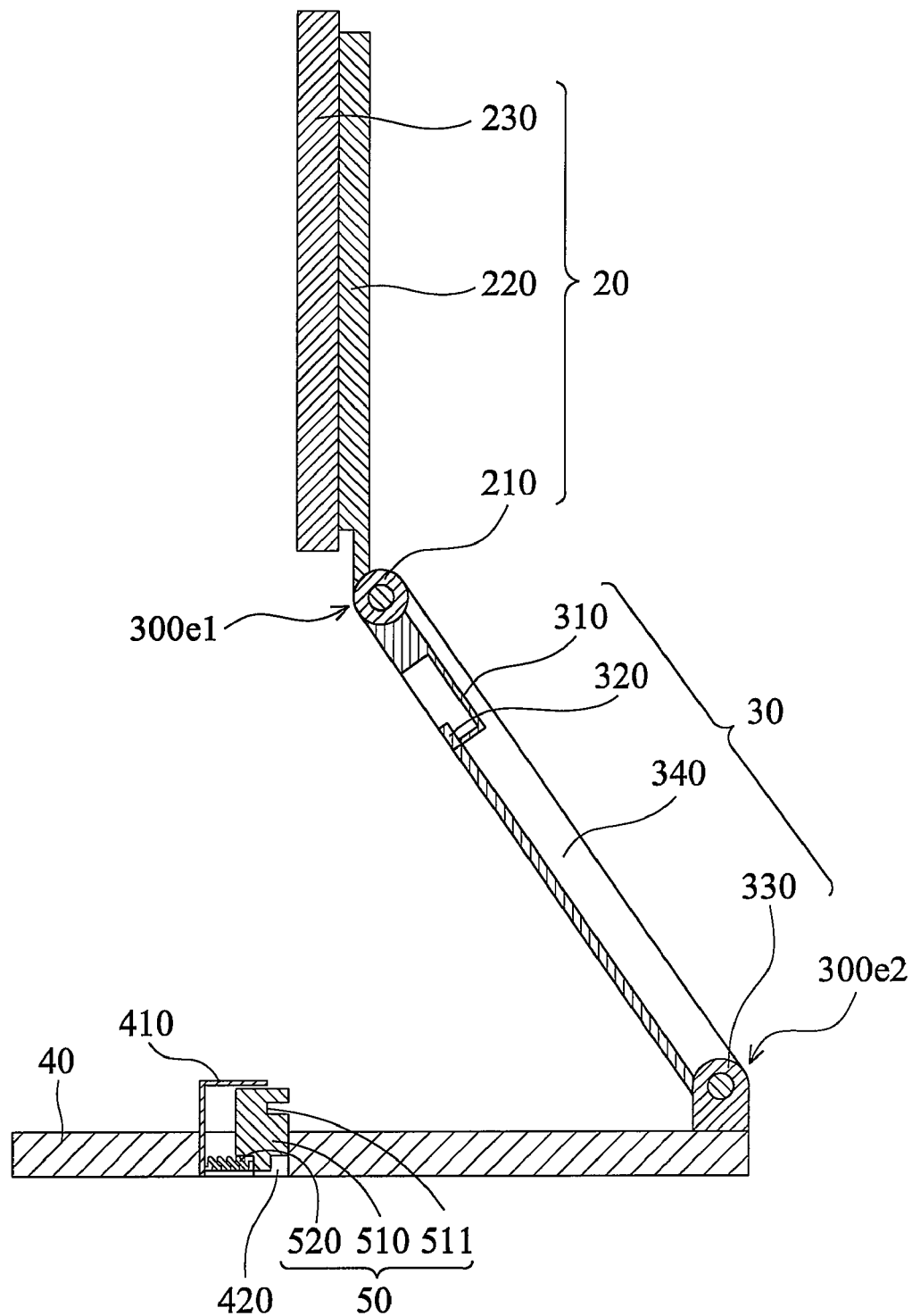
FIG. 3 is a sectional view of line A-A' of an embodiment of the display, wherein the display is folded.

Referring to FIG. 2 and FIG. 3, a display 10 with an automatic locking device comprises a body 20, a support 30 having a first end 300e1 connected to the body 20 and a second end 300e2 being opposite to the first end 300e1, a base 40 connected to the second end 300e2 of the support 30, and a sliding assembly 50.

The body 20 comprises a first hinge 210, a fixed board 220, and a screen 230. The first hinge 210 of the body 20 connects with the support 30, so that the body 20 can rotate around the support 30. The screen 230 is fixed to one surface of the fixed board 220.

Figure 4:
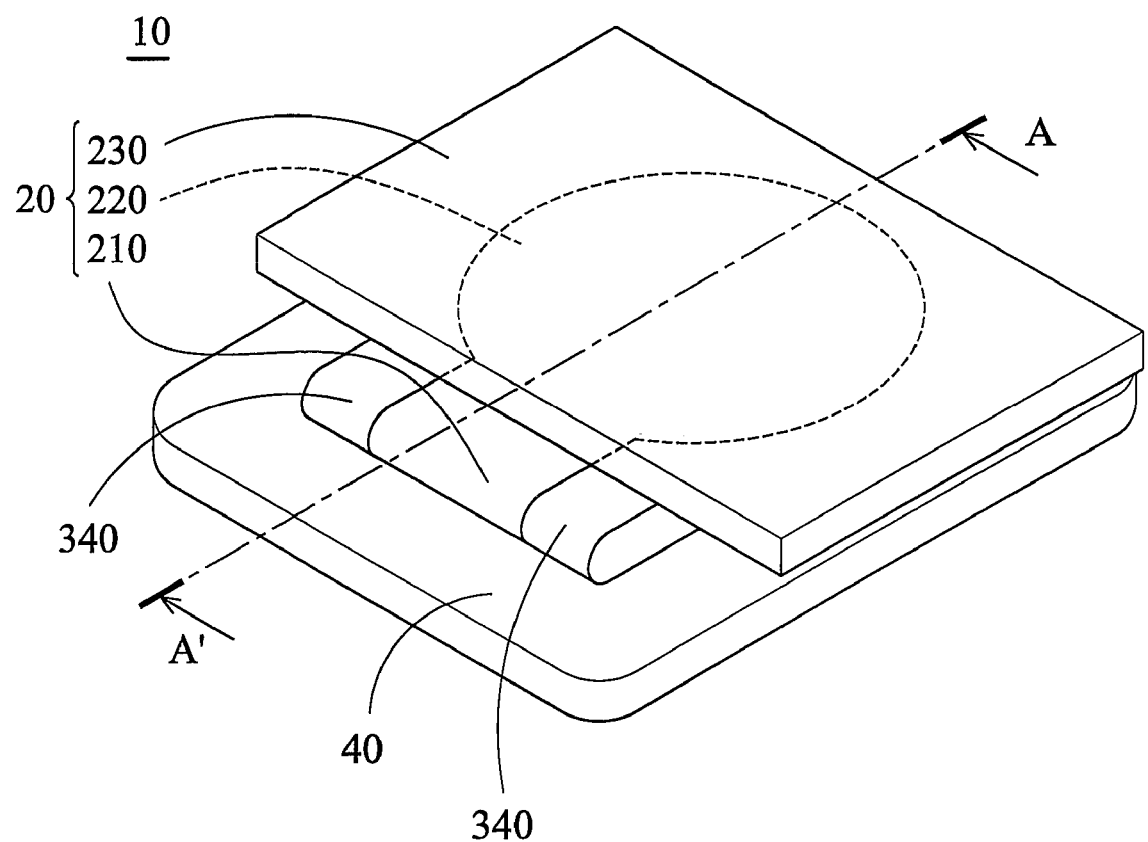
FIG. 4 is a 3-D schematic view of an embodiment of the display, wherein the display is folded.

Referring FIG. 2 to FIG. 5, the support 30 comprises an opening 310, an engaging element 320, a second hinge 330, and two support arms 340. The opening 310 is opposite to the base 40. The engaging element 320 is disposed below the opening 310. As shown in FIG. 2, two support arms 340 are respectively disposed on the left and right sides of the opening 310 and the engaging element 320. Furthermore, the fixed board 220 is received between two support arms 340. That is, the position of the fixed board 220 is between two support arms 340, as shown in FIG. 4.

Figure 5:
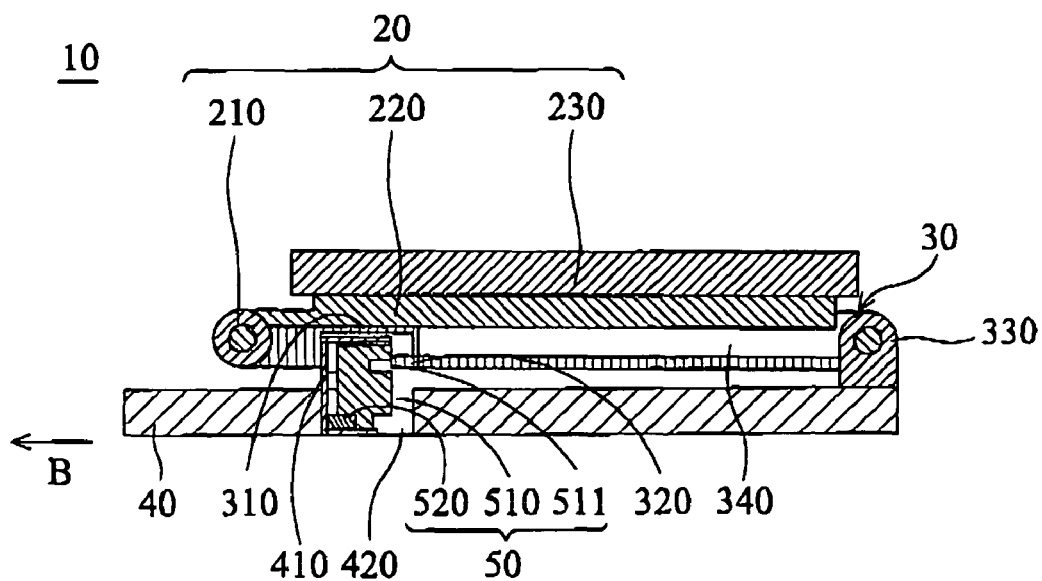
FIG. 5 is a sectional view of line A-A' in FIG. 4 when a sliding assembly is in the first position.
Figure 6:
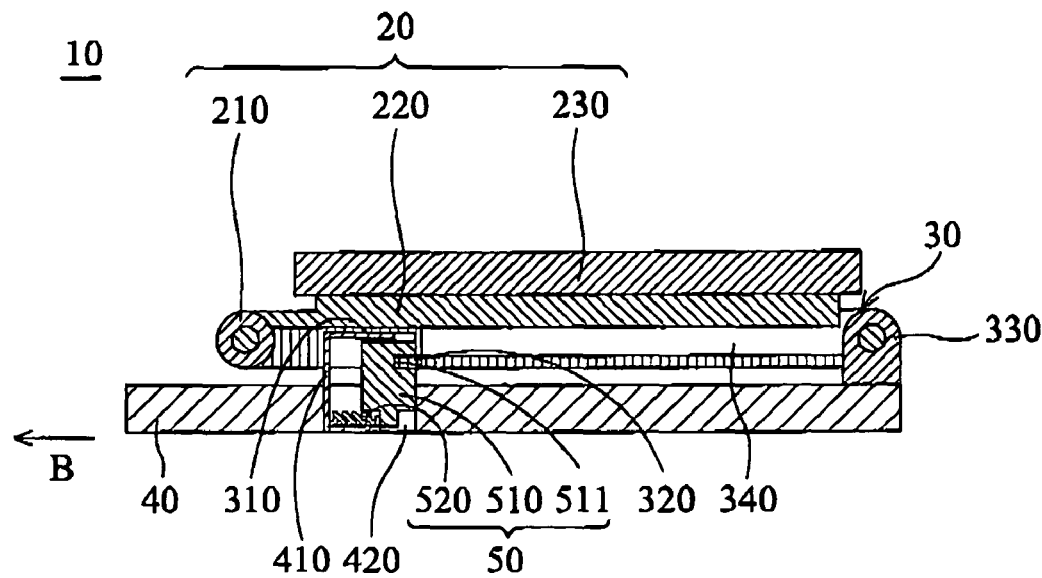
FIG. 6 is a sectional view of line A-A' in FIG. 4 when the sliding assembly is in the second position.

The base 40 comprises a cap 410 and a base opening 420. The cap 410 covering the sliding assembly 50 is utilized to guide the sliding element 510 of the sliding assembly 50, so that the sliding element 510 of the sliding assembly 50 is linearly slidable between two positions. The base opening 420 is located on the bottom of the base 40 to guide the elastic element 520 and the sliding element 510 of the sliding assembly 50. The sliding assembly 50 is movably disposed on the base 40 in a manner such that it can be slidable between a first position (as shown in FIG. 5) and a second position (as shown in FIG. 6), and comprises a sliding element 510 and an elastic element 520. The sliding element 510 can be conveniently pushed via the base opening 420. Furthermore, the sliding element 510 comprises a notch 511 thereon, and connects with the elastic element 520. When the sliding assembly 50 is in the first position, the engaging element 320 is separated from the notch 511. Afterward, the cap 410 is separated from the opening 310 of the support 30. When the sliding assembly 50 is in the second position, the opening 310 of the support 31 is engaged with the cap 410 and then the engaging element 320 is engaged in the notch 511. The elastic element 520 maintains the sliding assembly 50 in the second position.

Before packing into a box, the fixed board 320 is received between two support arms 340. After the support 30 is pressed downward, the cap 410 is received in the opening 310 and then the engaging element 320 is engaged with the notch 511 of the sliding element 510. The body 20, the support 30, and the base 40 are tightly abutted. As described, the assembly of the display 10 is more convenient, and time and production costs are reduced.

The display 10 can be easily took out from the box. Furthermore, only the sliding element 510 is moved via the base opening 420 along the direction B of FIG. 5, and the elastic element 520 is pressed. At the same time, the engaging element 320 is separated from the notch 511. Thus, the display 10 can be taken out simply as shown in FIG. 2 and FIG. 3. Additionally, elasticity from the elastic element 520 enables the sliding assembly 50 to return to the position as shown in FIG. 3.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display with a locking device, comprising:
   a body;
   a support comprising an opening, an engaging element, a first end of the support connected to the body, through a first hinge and a second end of the support being opposite to the first end of the support;
   a base, connecting and being rotatable with the second end of the support, comprising a cap; and
   a sliding assembly, movably disposed on the base, comprising a sliding element having a notch, wherein the sliding assembly selectively slides between a first position and a second position;
   wherein when the sliding assembly is in the first position, the support is separated from the sliding assembly and the sliding element is received in the cap, when the sliding assembly is in the second position, the support is engaged with the sliding assembly and the sliding element protrudes from the cap and is received in the opening and engaged with the engaging element;
   wherein the sliding assembly further comprises an elastic element connecting with the sliding element; when the sliding assembly is in the first position, the engaging element separates from the notch and the cap separates from the opening of the support; when the sliding assembly is in the second position, the opening of the support is engaged in the cap and the engaging element is engaged in the notch, and the elastic element keeps the sliding assembly in the second position.

2. The display as claimed in claim 1, further comprising a second hinge connecting with the support and the base, wherein when the sliding assembly is in the second position, the support is engaged with the sliding assembly, so that the support is unable to rotate relative to the base.

3. The display as claimed in claim 1, wherein the first hinge connects the body and the support, and the body rotates with respect to the support.

4. The display as claimed in claim 3, the body further comprising a fixed board connecting with the support through the first hinge.

5. The display as claimed in claim 4, the body further comprising a screen fixed on one surface of the fixed board.

6. The display as claimed in claim 4, the support further comprising two support arms, and the fixed board received between the support arms.

7. The display as claimed in claim 4, wherein the fixed board rotates with respect to the support.

8. The display as claimed in claim 1, further comprising a second hinge connecting with the support and the base, when the sliding assembly is in the first position, the support is separated from the sliding assembly, so that the support is capable to rotate relative to the base.

9. A display with a locking device, comprising:
   a first hinge;
   a screen connected to the first hinge;
   a second hinge;
   a support, comprising: an engaging element, an opening; a first end connected to the first hinge, a second end connected to the second hinge, the screen being rotatable to the support with the first hinge; and the second end being opposite to the first end of the support;
   a base connecting with the second end of the support in a rotatable manner by the second hinge, having a base opening, and a cap; and
   a sliding assembly being slidable between a first position and a second position, guided by the base opening of the base, and the cap covering the sliding assembly and the base opening;
   wherein when the sliding assembly is in the first position, the support is separated from the sliding assembly, when the sliding assembly is in the second position, the sliding assembly is received in the opening of the support and the engaging element is engaged with the sliding assembly.

10. The display as claimed in claim 9, wherein the sliding assembly further comprises:
    a sliding element having a notch; and
    an elastic element connecting with the sliding element, wherein when the sliding assembly is in the first position, the engaging element separates from the notch and the cap separates from the opening of the support, when the sliding assembly is in the second position, the opening of the support is engaged in the cap and the engaging element is engaged in the notch, and the elastic element keeps the sliding assembly in the second position.

11. The display as claimed in claim 9, the sliding assembly further comprising:
    a sliding element having a notch for engaging the support; and
    an elastic element connecting with the sliding element;
    wherein the sliding element is pushed via the base opening on a bottom of the base.

12. The display as claimed in claim 11, wherein the elastic element maintains the sliding element in the second position and the sliding element is pushed to the first position.

13. A display with a locking device, comprising:
    a first hinge;
    a second hinge;
    a support, comprising: a first end and a second end opposite to the first end, the first end connected to the first hinge, and the second end connected to the second hinge;
    a screen rotatably connected to the support by the first hinge, but separated from the second hinge;
    a base rotatably connected to the support by the second hinge, but separated from the first hinge, the base having a base opening and a cap; and
    a sliding assembly movably disposed on the base, and selectively positioned between a first position and a second position, the sliding assembly being guided by the base opening when moving between the first position and the second position, the cap covering the sliding assembly and the base opening;
    wherein when the sliding assembly is positioned in the first position, the support is separated from the sliding assembly, so that a distance between the first hinge and the base is adjustable when the support rotates relative to the base;
    wherein when the sliding assembly is positioned in the second position, the support is engaged with the siding assembly, so that the support is unable to rotate relative to the base.

14. The display as claimed in claim 13, wherein the sliding assembly is capable of being pushed via the base opening formed on a bottom surface of the base.

15. The display as claimed in claim 13, wherein the display further comprises an elastic element, and the elastic element moving the sliding assembly toward the second position.

16. The display as claimed in claim 13, wherein the support further comprises a support opening, and the sliding assembly is received in the support opening when the sliding assembly is in the second position.

* * * * *